United States Patent [19]

Costino

[11] Patent Number: 4,792,792
[45] Date of Patent: Dec. 20, 1988

[54] ANTI-THEFT SYSTEM FOR AN AUTOMOTIVE VEHICLE

[76] Inventor: Harold F. Costino, 183 Bay 54th St., Brooklyn, N.Y. 11214

[21] Appl. No.: 10,723

[22] Filed: Feb. 4, 1987

[51] Int. Cl.⁴ .............................................. B60R 25/10
[52] U.S. Cl. ....................................... 340/64; 340/63; 180/287; 307/10 AT
[58] Field of Search .............. 340/63, 64; 307/10 AT; 180/287

[56] References Cited

U.S. PATENT DOCUMENTS

| | | | |
|---|---|---|---|
| 1,561,194 | 11/1925 | Stimson | 307/10 AT |
| 3,654,602 | 4/1972 | Jones | 340/64 |
| 3,850,260 | 11/1974 | Obermeit . | |
| 4,354,174 | 10/1982 | Heidman, Jr. | 340/63 |
| 4,480,249 | 10/1984 | Heidman, Jr. | 340/63 |

FOREIGN PATENT DOCUMENTS

| | | | |
|---|---|---|---|
| 2094045 | 9/1982 | United Kingdom | 340/63 |
| 2115196 | 9/1983 | United Kingdom | 340/63 |

*Primary Examiner*—Joseph A. Orsino
*Assistant Examiner*—Brian R. Tumm
*Attorney, Agent, or Firm*—Norman B. Rainer

[57] ABSTRACT

A system of electrical components interactively associated with existing conventional features of an automotive vehicle functions as a deterrent to theft of the vehicle. The components, which include a relay and two SPST switches, are arranged in a manner such that, with attempted theft, the engine is deactivated, the horn sounds, and the headlights are turned on.

5 Claims, 1 Drawing Sheet

ANTI-THEFT SYSTEM FOR AN AUTOMOTIVE VEHICLE

BACKGROUND OF THE INVENTION

This invention concerns apparatus and electrical circuitry to be installed within an automobile and utilizing existing automotive circuits to disable the ignition and attract attention to said automobile in event of attempted theft.

Numerous structures are disclosed in the prior art which are operable in various complex manners to de-energize the ignition system and sound off alarms to thwart non-authorized movement of an automotive vehicle. Additionally, numerous structures are utilized to cease flow of fuel and de-energize the ignition system, but the prior art structures are very complicated in nature; expensive to manufacture; and unsafe for normal usage. Such devices are usually complicated to install; and most are installed in such a way to warn a potential car-thief that there is some anti-theft device. Where the thief is alerted to the fact that there is such an anti theft device in the automobile, he is very apt to disarm the device or cause substantial damage to the automobile in his attempt to do so. In addition, most automotive alarm devices do not allow the owner of the vehicle to leave the automobile unattended, with the engine running, and the anti-theft device activated.

It is accordingly an object of the present invention to provide a means to disable the ignition of an automobile in the event of an attempted theft while said automobile is left unattended by the operator with the engine running.

It is another object of this invention to alert the owner of said automobile, or others to said attempted theft by activating the horn and headlights of said automobile.

It is a further object of this invention to provide a tamper resistant system which a potential thief cannot disable.

It is yet another object of this invention to provide anti-theft protection at all times without consuming any power until the system has been tripped.

It is still another object of this invention to provide an anti theft system for an automobile which is easy to install, economically utilizes existing electrical circuitry and components of said automobile, and will not damage the automobile or injure the operator.

SUMMARY OF THE PRESENT INVENTION

The above and other beneficial objects and advantages are accomplished in accordance with the present invention by an anti-theft system for an automotive vehicle having a storage battery, electrical ignition coil, headlights, horn, brake and reverse lights, brake light switch activated by a brake pedal, reverse light switch activated by a transmission shift lever, and chassis-grounded electrical distribution system, said anti-theft system, comprising:

(a) a first circuit employing relay means having a coil activated by a positive flow of twelve volt direct current from the automotive vehicle's brake and/or reverse lights circuits, said current having passed through a first SPST activate switch, said coil being negatively grounded through a second SPST switch which is either hidden or key-activated, (b) a second circuit which grounds the spark from the automobile ignition coil to the chassis of the automobile upon activation of said relay means, thereby disabling the ignition of said automobile, (c) a third circuit controlled by said relay means, which provides current from the automobile's battery to the automobile's horn, (d) a fourth circuit controlled by said relay means, which provides current from the automobile's battery to the automobile's headlights, and (e) a fifth circuit controlled by said relay means and providing current from the automobile's battery to activate said relay means in a manner bypassing the brake and reverse light circuits, thereby rendering said first SPST switch useless and causing said second SPST switch to be the only means for turning off the horn and headlights and re-starting the automobile.

In a preferred embodiment of the system, a 10 ohm register is connected between the ignition coil wire and the automobile's chassis to prevent damage to the electronic ignition system.

In another preferred embodiment, two signal flashers are employed in the second and third circuits for the horn and headlights, causing intermittant activation thereof and thereby reducing the current draw and propensity to run-down the automobile's battery.

In another preferred embodiment, a 30 amp circuit breaker is employed in the system between the automobile's battery and all other connections in order to prevent damage to the battery and the automobile's electrical system due to a possible malfunction of the anti-theft device.

In still another preferred embodiment, one diode is inserted between the brake light circuit and the anti-theft device, and a second diode is inserted between the reverse light circuit and the anti-theft system, said diodes serving to prevent a back-flow of current from said anti-theft system into said circuits or between said circuits.

DESCRIPTION OF THE PREFERRED EMBODIMENT

Figure 1:
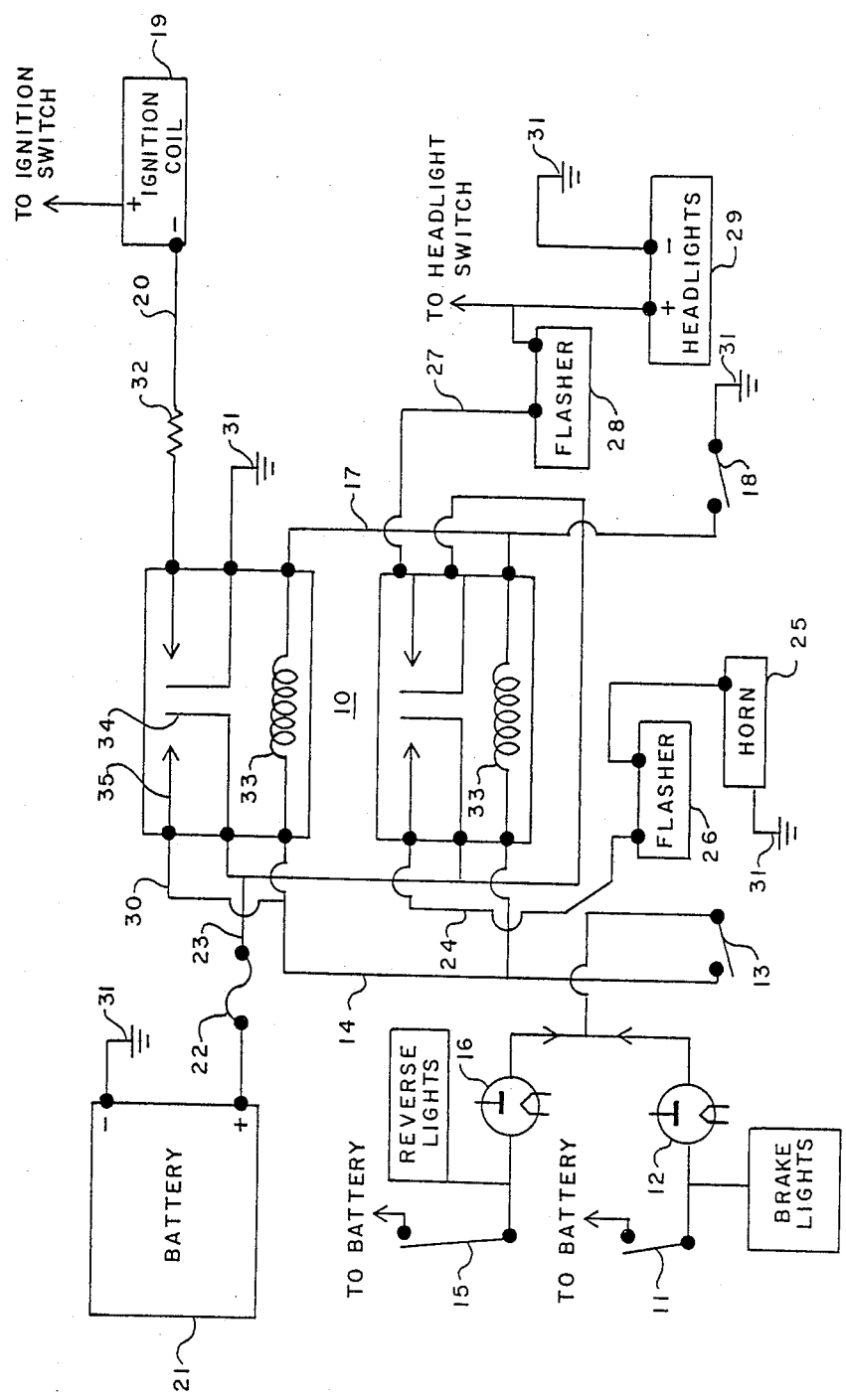
FIG. 1 is an electrical schematic diagram of an embodiment of the anti-theft system of the present invention, shown in association with interactive conventional components of an automotive vehicle.

Referring to the drawing, an embodiment of the apparatus of this invention in the form of a schematic diagram is shown comprised of five circuits. In the first circuit, relay apparatus 10 is shown having at least one coil 33 activated by a positive flow of twelve volt direct current through the automobile's brake light switch 11 routed through diode 12, first SPST activate switch 13, and conductor wire 14. Said relay apparatus may be comprised of two twelve VDC-DPDT relays with 10 amp, 125 VAC contacts, such as the Archer brand part number 275-218. The ingoing contact terminal of relay 10 is designated by numeral 34, and the interactive outgoing contact terminal is designated by numeral 35. Alternately, current may be applied to relay 10 through the automobile's reverse light switch 15 through diode 16, switch 13 and wire 14. Said twelve volt current is supplied to relay 10 when the automobile's brake pedal is depressed thereby activating brake switch 11 or when the automobile's transmission shift lever is moved thereby activating reverse light switch 15. Current is switched on and off by first SPST activate switch 13, and negatively grounded from relay 10 to the automobile's chasis 31 through conductor wire 17 and second SPST switch 18. Said switch 18 is either hidden or key-activated. Both switches 13 and 18 are activated manually by the owner of the vehicle prior to leaving the automobile unattended.

In the second circuit, switched by relay 10, the spark producing current from coil wire 19 is grounded to the chasis through wire 20 and a resistor 32, thereby disabling the ignition of said automobile. Resistor 32 may be a 10 ohm, 10 watt 10% tolerance type such as the Archer brand part number 271-132.

In the third circuit, switched by relay 10, twelve volt current from the automobile's battery 21 is routed through a 30 amp circuit breaker 22 and wires 23 and 24 to the automobile's horn 25, which is controlled as to sound in an intermittant manner through a flasher 26.

In the fourth circuit, switched by relay 10, twelve volt current from battery 21 is routed through circuit breaker 22 and wires 23 and 27 to the automobile's headlights 29, which are controlled as to flash in an intermittant manner through flasher 28.

In the fifth circuit, switched by relay 10, twelve volt current, from battery 21 is routed through circuit breaker 22 and wires 23 and 30 to relay 10, thereby bypassing the brake and reverse light activation circuits 11 and 15, and rendering SPST switch 13 useless. Manual de-activation of the grounding SPST switch 18, and subsequent interruption of the flow of twelve volt current thereby becomes the only means for disabling the horn and headlights and re-starting the automobile.

By virtue of the aforementioned system, a would be thief who attempts to steal an automobile which has been left unattended with or without the engine running and the anti-theft system on, will activate said system by depressing the automobile's brake pedal or shifting the automobile's transmission into drive, thereby shutting off the engine and causing the automobile's horn to sound intermittantly and headlights to flash. The would-be thief could not deactivate the anti-theft system even if the first SPST switch could be found. The owner, upon return could deactivate the system by means of the second SPST switch.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An anti-theft system for an automotive vehicle having operational components including a storage battery, electrical ignition coil, headlights, horn, brake lights, reverse lights, and chassis-grounded electrical distribution system, said anti-theft system, comprising:
    (a) a first circuit employing relay means having a coil activated by a positive flow of twelve volt direct current from the automotive vehicle's brake and/or reverse lights circuits, said current having passed through a first SPST activate switch, said coil being negatively grounded through a second SPST switch which is either hidden or key-activated,
    (b) a second circuit which grounds the spark from the automobile ignition coil to the chassis of the automobile upon activation of said relay means, thereby disabling the ignition of said automobile.
    (c) a third circuit controlled by said relay means, which provides current from the automobile's battery to the automobile's horn,
    (d) a fourth circuit controlled by said relay means, which provides current from the automobile's battery to the automobile's headlights, and
    (e) a fifth circuit controlled by said relay means and providing current from the automobile's battery to activate said relay means in a manner bypassing the brake and reverse light circuits, thereby rendering said first SPST switch useless and causing said second SPST switch to be the only means for turning off the horn and headlights and re-starting the automobile.

2. The anti-theft system of claim 1 wherein a resistor is interposed between the ignition coil and the chassis to prevent damage to the electrical system vehicle.

3. The anti-theft system of claim 1 wherein a signal flasher is incorporated into said second circuit and into said third circuit for causing intermittant activation serving to reduce the amount of current drawn from said battery.

4. The anti-theft system of claim 1 wherein a circuit breaker is interposed between the battery and each operational component to prevent damage due to possible malfunction of the anti-theft system.

5. The anti-theft system of claim 1 wherein a diode is inserted into the brake light circuit and into the reverse light circuit, said diode serving to prevent back-flow of current from the anti-theft system into or between said circuits.

* * * * *